(12) United States Patent
Chue et al.

(10) Patent No.: US 8,482,873 B1
(45) Date of Patent: Jul. 9, 2013

(54) DISK DRIVE EMPLOYING PULSE WIDTH MODULATION OF HEAD CONTROL SIGNAL

(75) Inventors: Jack M. Chue, Los Altos, CA (US);
Tomas D. Hugunin, Cupertino, CA (US); William D. Huber, Hollister, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 586 days.

(21) Appl. No.: 12/032,783

(22) Filed: Feb. 18, 2008

(51) Int. Cl.
*G11B 5/02* (2006.01)

(52) U.S. Cl.
USPC .......................................................... 360/55

(58) Field of Classification Search
USPC 360/75, 25, 46, 73.01, 73.03, 78.13; 375/238
See application file for complete search history.

(56) References Cited

U.S. PATENT DOCUMENTS

| | | | |
|---|---|---|---|
| 4,775,902 A * | 10/1988 | Trovato et al. | 360/78.13 |
| 4,777,544 A | 10/1988 | Brown et al. | |
| 4,839,754 A * | 6/1989 | Gami et al. | 360/73.01 |
| 5,109,306 A | 4/1992 | Mase et al. | |
| 5,130,866 A | 7/1992 | Klaassen et al. | |
| 5,168,413 A | 12/1992 | Coker et al. | |
| 5,594,595 A | 1/1997 | Zhu | |
| 5,742,446 A | 4/1998 | Tian et al. | |
| 5,909,330 A | 6/1999 | Carlson et al. | |
| 6,008,640 A | 12/1999 | Tan et al. | |
| 6,052,243 A | 4/2000 | Shimada | |
| 6,097,559 A | 8/2000 | Ottesen et al. | |
| 6,175,456 B1 * | 1/2001 | Yun | 360/46 |
| 6,191,901 B1 | 2/2001 | Carlson et al. | |
| 6,268,976 B1 | 7/2001 | Carlson et al. | |
| 6,288,856 B1 | 9/2001 | Ottesen et al. | |
| 6,310,740 B1 | 10/2001 | Dunbar et al. | |
| 6,417,981 B1 | 7/2002 | Smith | |
| 6,452,735 B1 | 9/2002 | Egan et al. | |
| 6,459,539 B1 | 10/2002 | Carlson et al. | |
| 6,493,169 B1 | 12/2002 | Ferris et al. | |
| 6,501,606 B2 | 12/2002 | Boutaghou et al. | |
| 6,519,102 B1 | 2/2003 | Smith et al. | |
| 6,525,892 B1 | 2/2003 | Dunbar et al. | |
| 6,608,727 B2 | 8/2003 | Ottesen et al. | |
| 6,611,389 B1 | 8/2003 | Liu et al. | |
| 6,624,957 B1 * | 9/2003 | Yun | 360/25 |
| 6,671,110 B2 | 12/2003 | Baba et al. | |
| 6,674,590 B2 | 1/2004 | Ottesen et al. | |
| 6,700,724 B2 | 3/2004 | Riddering et al. | |
| 6,717,764 B2 | 4/2004 | Lake | |
| 6,735,027 B2 | 5/2004 | Helsel et al. | |
| 6,762,899 B2 | 7/2004 | Ottesen et al. | |
| 6,765,745 B2 | 7/2004 | Smith et al. | |
| 6,785,081 B2 | 8/2004 | Chapin et al. | |
| 6,798,605 B2 | 9/2004 | Kurita et al. | |
| 6,801,376 B2 | 10/2004 | Smith | |
| 6,822,816 B2 | 11/2004 | Dakroub | |
| 6,865,040 B2 | 3/2005 | Fayeulle et al. | |
| 6,894,854 B1 | 5/2005 | Carlson et al. | |
| 6,930,844 B2 | 8/2005 | Yeh et al. | |

(Continued)

*Primary Examiner* — Fred Tzeng

(57) ABSTRACT

A disk drive is disclosed comprising a plurality of disk surfaces, and a plurality of heads actuated over the respective disk surfaces. In one embodiment, control circuitry generates a pulse duty cycle signal for one of the heads. In another embodiment, the control circuitry generates a first pulse width modulated signal for a first head, and a second pulse width modulated signal for a second head, wherein the second pulse width modulated signal comprises a phase offset from the first pulse width modulated signal.

16 Claims, 7 Drawing Sheets

PHASE OFFSET PULSE DUTY CYCLE

U.S. PATENT DOCUMENTS

| | | | |
|---|---|---|---|
| 6,980,383 | B2 | 12/2005 | Brunnett et al. |
| 6,992,853 | B2 | 1/2006 | Chang |
| 7,016,131 | B2 | 3/2006 | Liu et al. |
| 7,023,647 | B2 | 4/2006 | Bloodworth et al. |
| 7,038,875 | B2 | 5/2006 | Lou et al. |
| 7,046,463 | B2 | 5/2006 | Gay Sam et al. |
| 7,068,449 | B2 | 6/2006 | Riddering et al. |
| 7,068,451 | B1 | 6/2006 | Wang et al. |
| 7,068,457 | B2 | 6/2006 | Riddering et al. |
| 7,092,195 | B1 | 8/2006 | Liu et al. |
| 7,095,578 | B2 | 8/2006 | Ma |
| 7,158,325 | B1 | 1/2007 | Hu et al. |
| 7,180,692 | B1 | 2/2007 | Che et al. |
| 7,253,984 | B1 | 8/2007 | Patapoutian et al. |
| 7,265,933 | B1 | 9/2007 | Phan et al. |
| 7,376,182 | B2 * | 5/2008 | Kris ................ 375/238 |
| 7,605,997 | B2 | 10/2009 | Yamazaki |
| 7,630,162 | B2 | 12/2009 | Zhao et al. |
| 7,714,883 | B2 | 5/2010 | Fujikawa et al. |
| 7,787,210 | B1 | 8/2010 | Drouin et al. |
| 7,839,595 | B1 | 11/2010 | Chue et al. |
| 2002/0167745 | A1 | 11/2002 | Ottesen |
| 2003/0002183 | A1 | 1/2003 | Fioravanti |
| 2003/0184899 | A1 | 10/2003 | Gay Sam et al. |
| 2003/0184907 | A1 * | 10/2003 | Li et al. ................ 360/73.03 |
| 2003/0218813 | A1 | 11/2003 | Dakroub |
| 2004/0075940 | A1 | 4/2004 | Bajorek et al. |
| 2005/0030284 | A1 * | 2/2005 | Braun et al. ................ 345/156 |
| 2005/0052415 | A1 * | 3/2005 | Braun et al. ................ 345/161 |
| 2005/0128630 | A1 | 6/2005 | Huang et al. |
| 2006/0146437 | A1 | 7/2006 | Khurshudov et al. |
| 2006/0268445 | A1 | 11/2006 | Brannon et al. |
| 2007/0127148 | A1 | 6/2007 | Yokohata et al. |
| 2007/0211368 | A1 | 9/2007 | Shibano et al. |
| 2007/0268615 | A1 | 11/2007 | McFadyen et al. |
| 2008/0030888 | A1 | 2/2008 | Brunnett et al. |
| 2010/0238588 | A1 | 9/2010 | Drouin et al. |
| 2011/0043938 | A1 | 2/2011 | Mathew et al. |

* cited by examiner

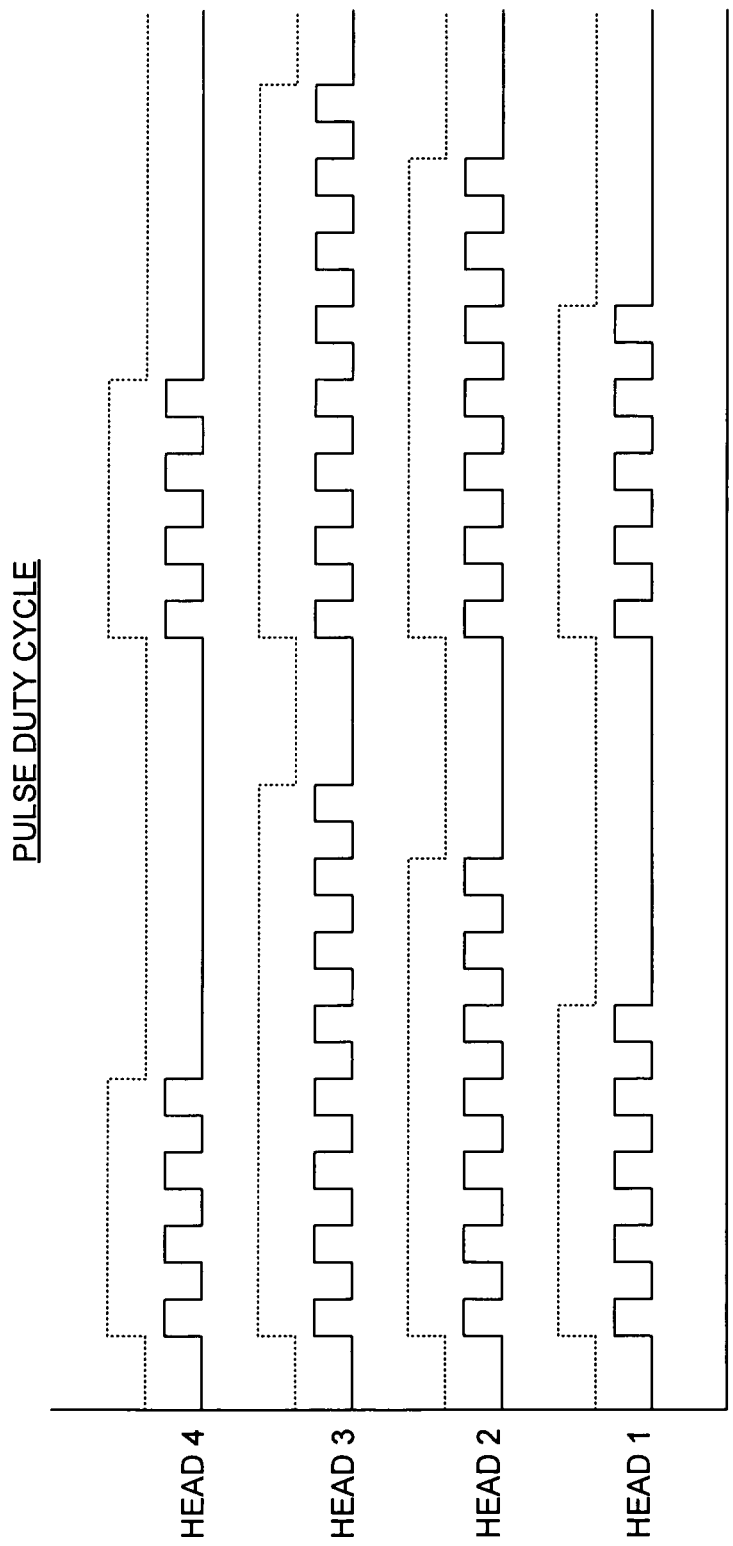

DISK DRIVE EMPLOYING PULSE WIDTH MODULATION OF HEAD CONTROL SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise a dynamic fly height (DFH) controller, such as a heater which controls the fly height through thermal expansion or a piezoelectric (PZT) actuator. It is desirable to determine the appropriate DFH control setting (e.g., appropriate current applied to the heater or PZT actuator) that achieves the target fly height for each head.

During certain modes of operation, the preamp may be configured to generate the head control signals for multiple heads, for example, when bank servo writing or when reading from multiple disk surfaces simultaneously. It is therefore desirable to simultaneously generate head control signals in a disk drive while reducing the power dissipation of the preamp.

BRIEF DESCRIPTION OF THE DRAWINGS

FIG. 3 shows an embodiment of the present invention wherein the control signal applied to the head comprises a pulse duty cycle signal.

DETAILED DESCRIPTION OF EMBODIMENTS OF THE INVENTION

Figure 1:
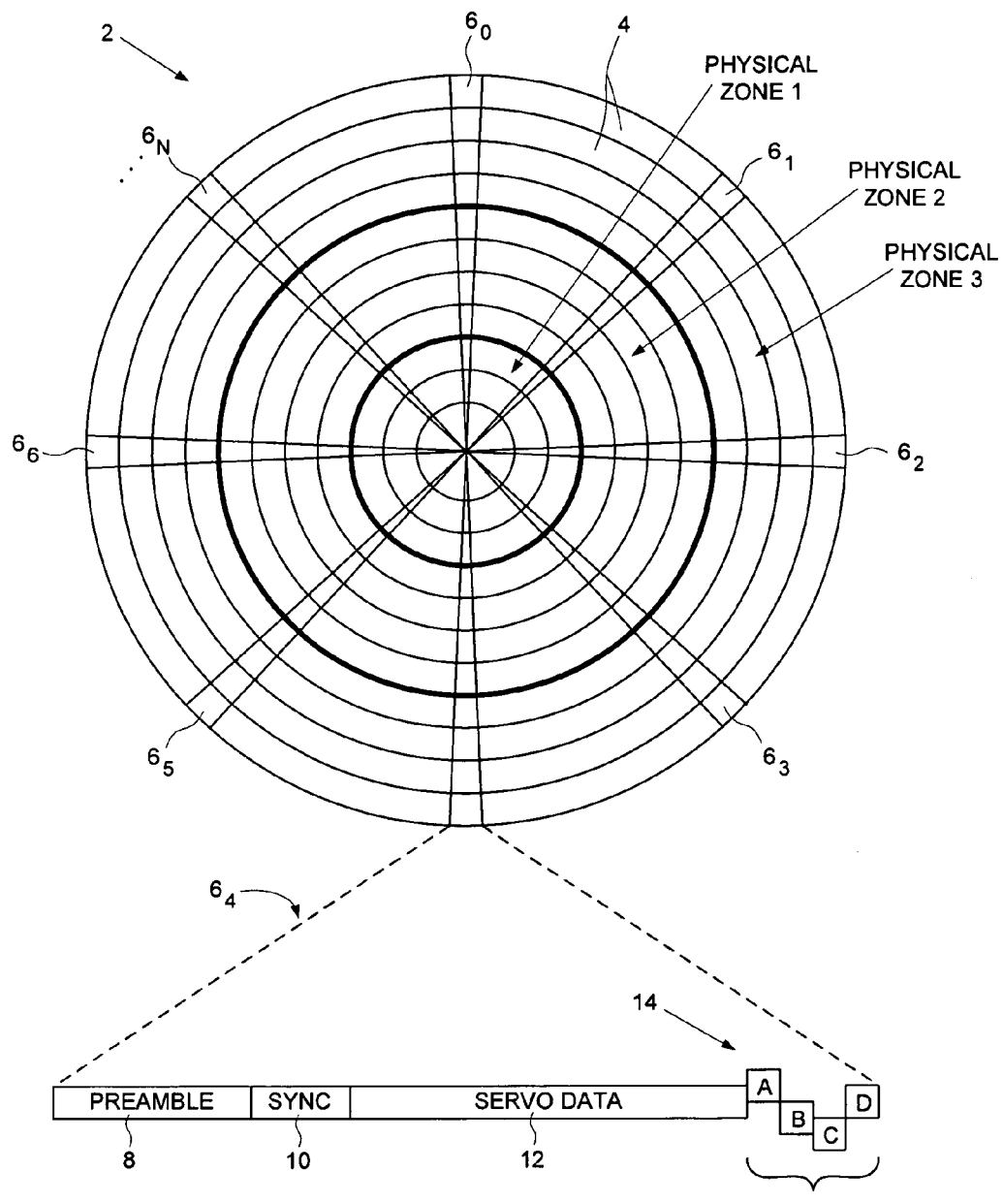
FIG. 1 shows a prior art disk format comprising a plurality of data tracks defined by a plurality of servo sectors.
Figure 2A:
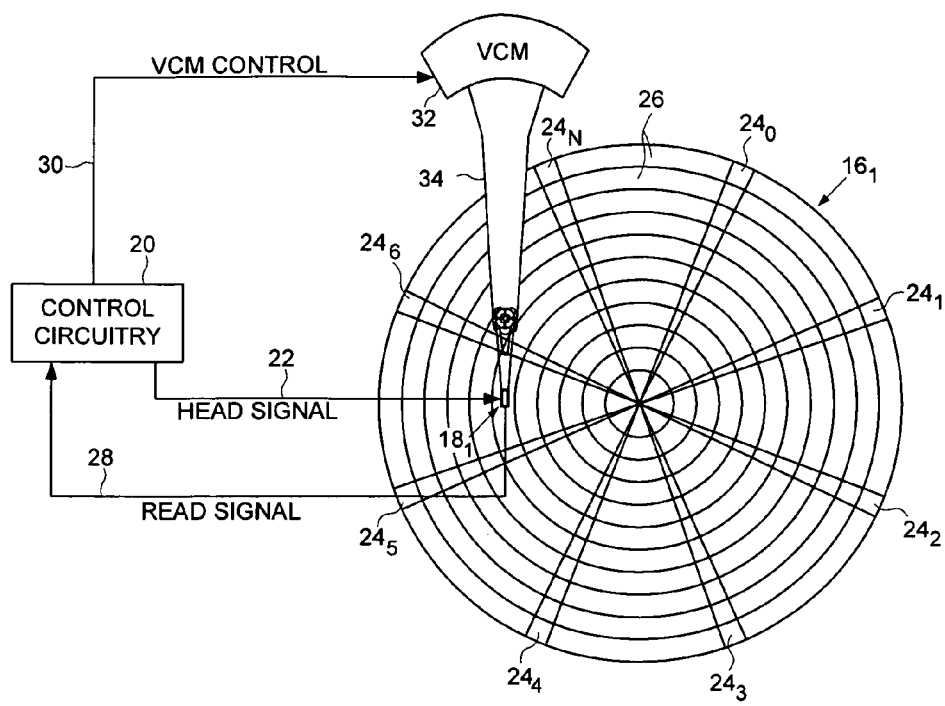
FIG. 2A shows a disk drive according to an embodiment of the present invention comprising a head actuated over the disk, and control circuitry for generating a control signal applied to the head.
Figure 2B:
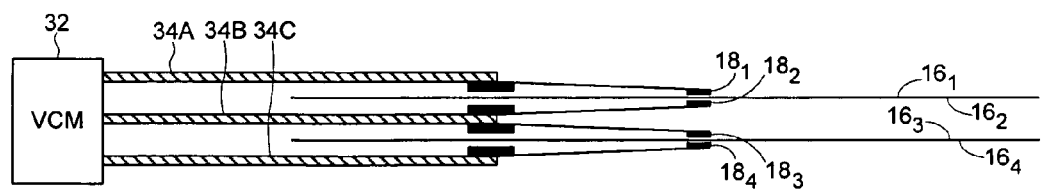
FIG. 2B shows a side view of a disk drive comprising four disk surfaces and four respective heads.

FIGS. 2A and 2B show a disk drive according to an embodiment of the present invention comprising a plurality of disk surfaces (e.g., $16_1$-$16_4$) and a plurality of respective heads (e.g., $18_1$-$18_4$). The disk drive further comprises control circuitry 20 for generating a control signal 22 applied to a first head $18_1$, where the control signal 22 may control, for example, a fly height of the head $18_1$ by adjusting a fly height controller, such as a heater or a piezoelectric actuator. The control signal 22 may also adjust any suitable characteristic, such as a current or voltage applied to the head or a component of the head. In one embodiment, the control signal 22 comprises a pulse duty cycle signal, and in another embodiment, the control signal 22 comprises a phase offset pulse width modulated (PWM) signal.

In the embodiment of FIG. 2A, each disk surface 16 comprises a plurality of embedded servo sectors $24_0$-$24_N$ that define a plurality of data tracks 26. The control circuitry 20 processes a read signal 28 emanating from the head 18 to demodulate the embedded servo sectors $24_0$-$24_N$ and generate a position error signal (PES) representing a radial offset of the head 18 from a target track 26. The control circuitry 20 processes the PES with a suitable servo compensator to generate a control signal 30 applied to a voice coil motor (VCM) 32. The VCM 32 rotates an actuator arm 34 about a pivot in order to actuate the head 18 radially over the disk 16 in a direction that decreases the PES. In the embodiment of FIG. 2A, the servo sectors $24_0$-$24_N$ are concentric and define concentric data tracks 26. However, any suitable disk format may be employed in the embodiments of the present invention, such as servo sectors that define spiral data tracks, and/or servo sectors that define spiral servo tracks.

FIG. 3 shows example pulse duty cycle signals applied to the four heads $18_1$-$18_4$ of FIG. 2B according to an embodiment of the present invention. A pulse duty cycle signal is similar to a conventional pulse width modulated (PWM) signal, except that the on-time is pulsed as shown in FIG. 3. The conventional PWM signal is shown as a dotted line, whereas the corresponding pulse duty cycle signal is shown as a solid line. The pulse duty cycle signal may reduce the power dissipation of the control circuitry 20 (e.g., preamp) which may reduce the cost of the control circuitry (e.g., by reducing the cost of power transistors).

Figure 4A:
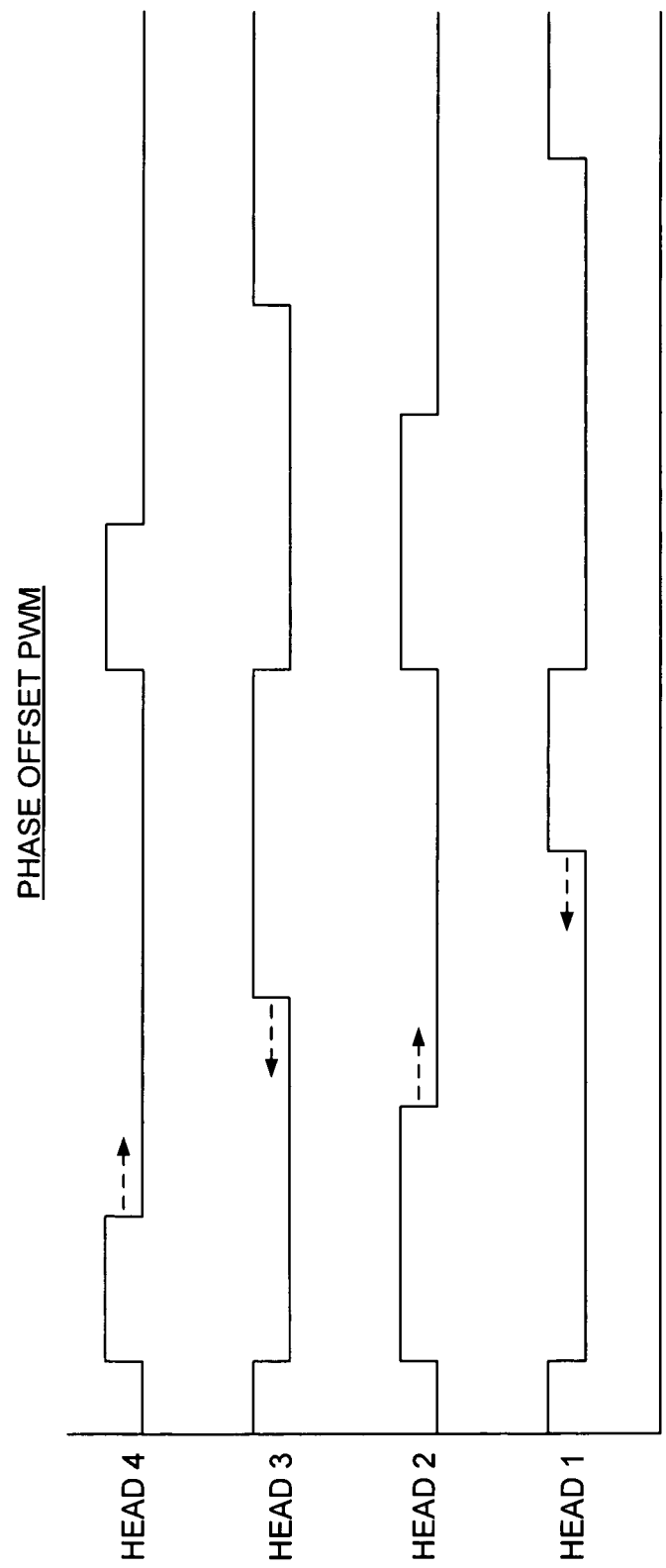
FIG. 4A shows an embodiment of the present invention wherein the control signals applied to four heads are phase offset PWM signals wherein two of the signals dissipate power at a time.

FIG. 4A shows an alternative embodiment of the present invention wherein the control signals applied to the heads comprise phase offset PWM signals. For example, the PWM signals applied to head 1 and head 2 may be phase offset, and the PWM signals applied to head 3 and head 4 may be phase offset. In this manner, only one of the pair of signals is high (dissipating power) at a time. For example, when the PWM signal for head 1 is high, the PWM signal for head 2 is low, and vise versa. In one embodiment, the duty cycles of the PWM signal pairs are adjusted toward one another as illustrated by the arrows in FIG. 4A. In one embodiment, the duty cycles of the PWM signal pairs are limited so that they never overlap, and in another embodiment, the duty cycles are allowed to overlap in a controlled manner. Employing a phase offset in the head control signals reduces the peak current load which may also reduce the cost of the control circuitry.

Figure 4B:
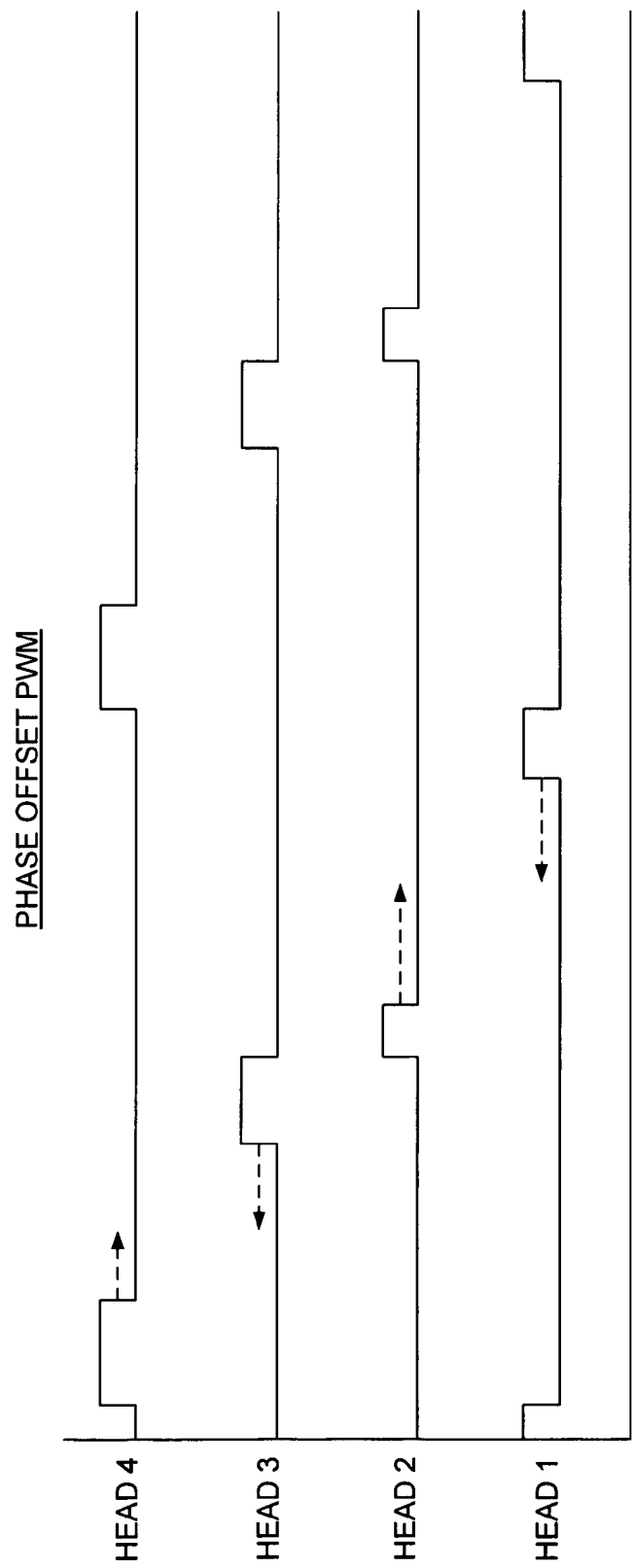
FIG. 4B shows an embodiment of the present invention wherein the control signals applied to four heads comprise phase offset PWM signals wherein one of the signals dissipates power at a time.

In the embodiment of FIG. 4A, two of the four PWM signals may be active high at a time (e.g., the PWM signal for head 1 and the PWM signal for head 3). In an alternative embodiment shown in FIG. 4B, the phase offsets and duty cycles are selected so that only one of the four PWM signals is active high at a time. This embodiment may be extended to any number of heads by selecting the appropriate phase offsets and duty cycle limits.

Figure 5A:
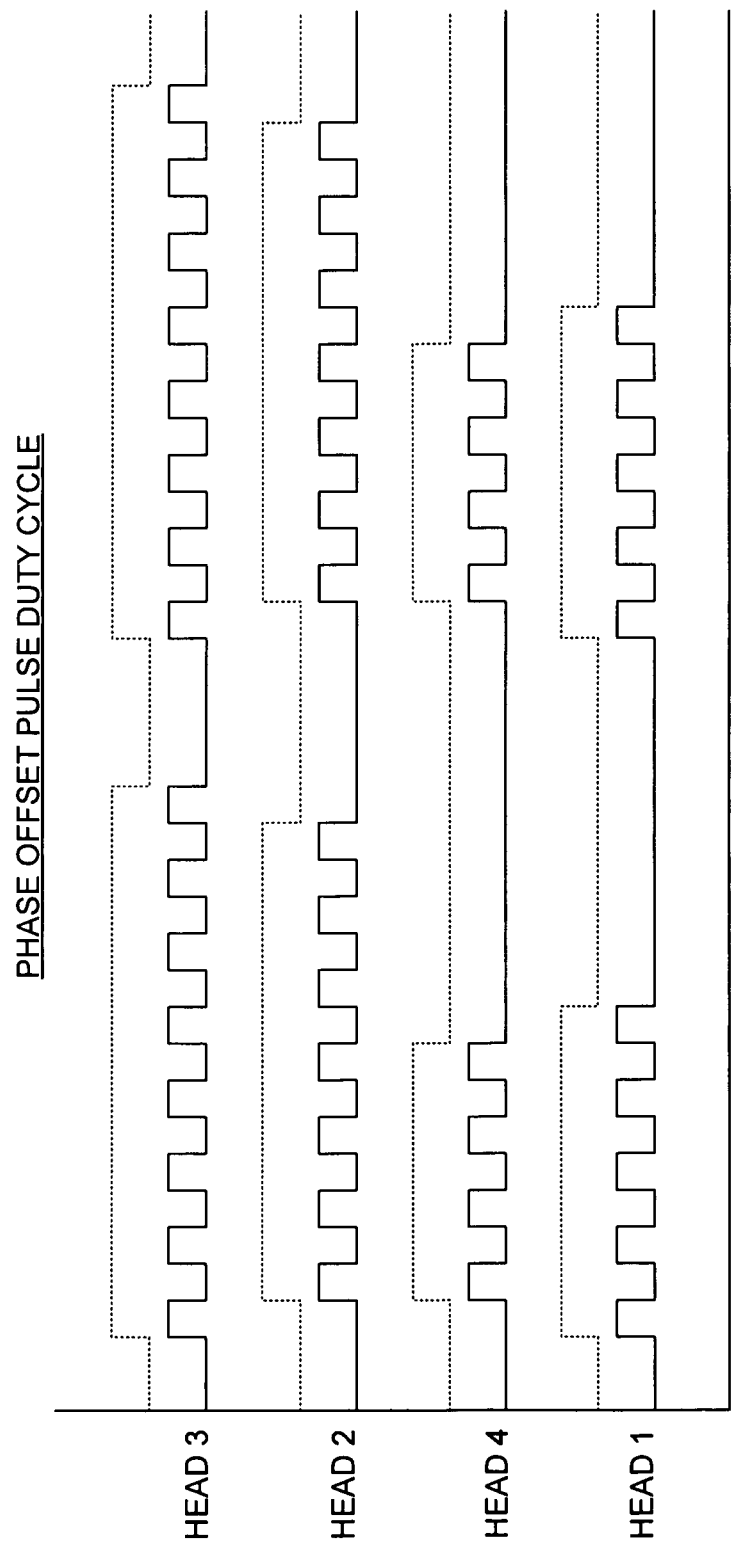
FIG. 5A shows an embodiment of the present invention wherein the control signals applied to four heads are phase offset pulse duty cycle signals wherein two of the signals dissipate power at a time.

FIG. 5A shows yet another embodiment of the present invention wherein the control signals applied to the heads comprise phase offset pulse duty cycle signals. In this embodiment, the control signals are paired and the pulses are offset by 180 degrees so that only one of the signal pairs is active at a time. In one embodiment, the signal pairs may be selected such that the control signals of similar power are paired together as shown in FIG. 5A (head 1 and head 4 are paired and offset, and head 2 and head 3 are paired and offset).

Figure 5B:
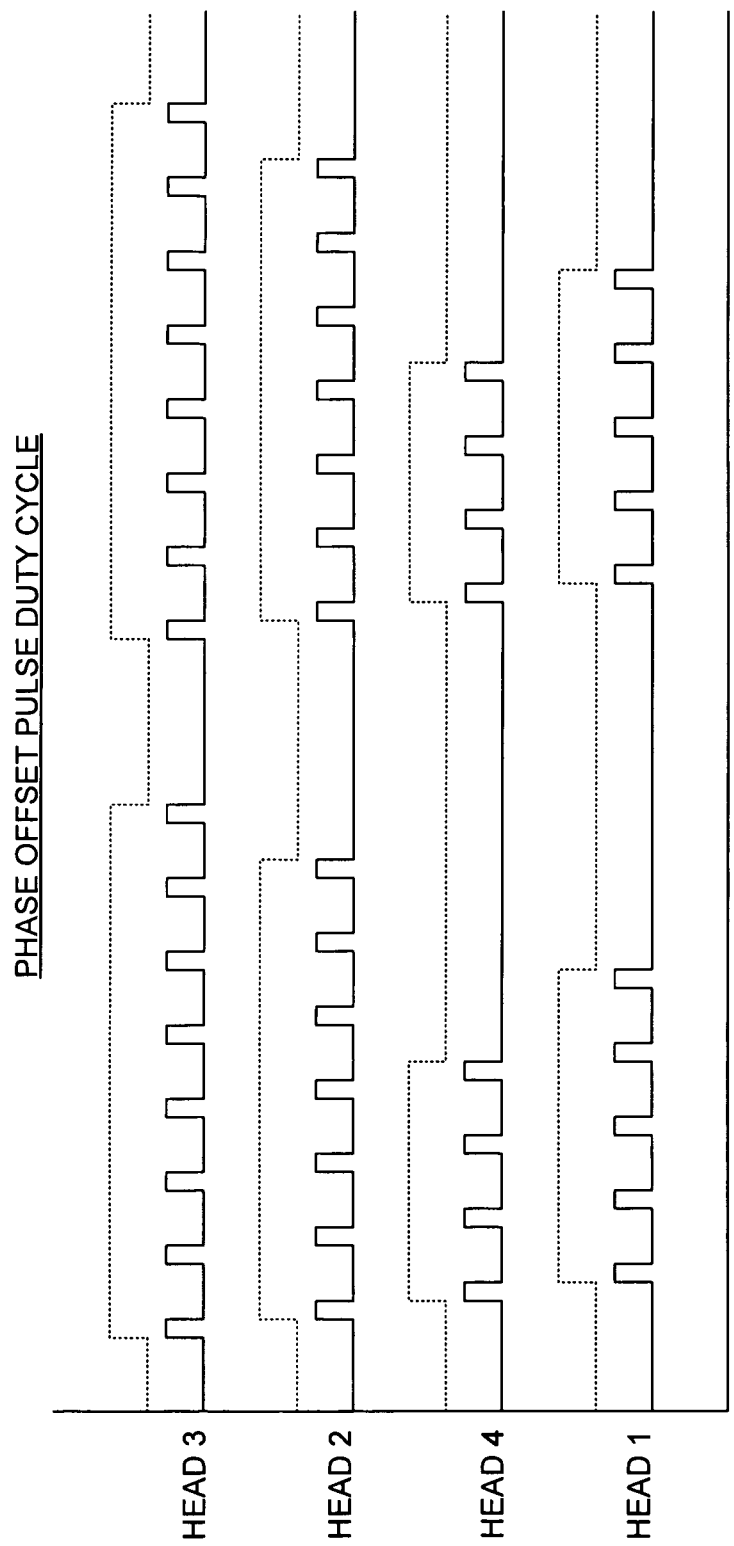
FIG. 5B shows an embodiment of the present invention wherein the control signals applied to four heads comprise phase offset pulse duty cycle signals wherein one of the signals dissipates power at a time.

In the embodiment of FIG. 5A, two of the four pulse duty cycle signals may be active high at a time (e.g., the pulse duty cycle signal for head 1 and the pulse duty cycle signal for head 3). In an alternative embodiment shown in FIG. 5B, the duty cycle is adjusted as well as the phase offsets so that only one of the four control signals is active high at a time. In the example of FIG. 5B, the pulse duty cycle is selected as 25% with a phase offset adjusted in 90 degree increments. However, this embodiment may be applied to any number of heads by selecting the appropriate pulse duty cycle and phase offset such that only one of the control signals is active high at a time.

Any suitable control circuitry 20 may be employed in the embodiments of the present invention, such as any suitable integrated circuit or circuits. For example, the control circuitry 20 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit which may implement all or part of the flow diagrams described herein, wherein the preamp may be implemented as a separate integrated circuit, integrated into the read channel or disk controller circuit, or integrated into an SOC.

In one embodiment, the control circuitry 20 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 20 comprises suitable logic circuitry, such as state machine circuitry.

In yet another embodiment, the control circuitry 20 of FIG. 2A is implemented within an external servo writer or a media writer for bank servo writing a plurality of disk surfaces, and the control signals 22 simultaneously control, for example, a fly height of the heads. The external servo writer or media writer comprises suitable circuitry (e.g., a preamp) for generating the head control signals 22 for a bank servo write operation. The external servo writer or media writer may write any suitable servo data to the disk surfaces, such as concentric product servo sectors, or spiral servo tracks, wherein the spiral servo tracks may be demodulated as normal servo sectors or used as seed patterns to write the concentric product servo sectors.

What is claimed is:

1. A disk drive comprising:
   a plurality of disk surfaces;
   a plurality of heads actuated over the respective disk surfaces; and
   control circuitry operable to generate a first pulse duty cycle signal for a first head and generate a second pulse duty cycle signal for a second head simultaneous with generating the first pulse duty cycle signal for the first head, wherein:
   the first pulse duty cycle signal comprises a pulse width modulated signal comprising an on-time that is pulsed; and
   the second pulse duty cycle signal is generated with a phase offset from the first pulse duty cycle signal.

2. The disk drive as recited in claim 1, wherein the first pulse duty cycle signal controls a fly height of the first head.

3. The disk drive as recited in claim 1, wherein the phase offset is selected so that only one of the first and second pulse duty cycle signals dissipates power at a time.

4. A disk drive comprising:
   a plurality of disk surfaces;
   a plurality of heads actuated over the respective disk surfaces; and
   control circuitry operable to:
   generate a first pulse width modulated signal for a first head; and
   generate a second pulse width modulated signal for a second head, wherein the second pulse width modulated signal comprises a phase offset from the first pulse width modulated signal.

5. The disk drive as recited in claim 4, wherein the first pulse width modulated signal controls a fly height of the first head.

6. The disk drive as recited in claim 4, wherein:
   the first pulse width modulated signal comprises a first duty cycle adjusted in a first direction; and
   the second pulse width modulated signal comprises a second duty cycle adjusted in a second direction opposite the first direction.

7. The disk drive as recited in claim 4, wherein:
   the first pulse width modulated signal comprises a first pulse duty cycle signal; and the second pulse width modulated signal comprises a second pulse duty cycle signal.

8. The disk drive as recited in claim 4, wherein the phase offset is selected so that only one of the first and second pulse width modulated signals dissipates power at a time.

9. A method of operating a disk drive, the disk drive comprising a plurality of disk surfaces, and a plurality of heads actuated over the respective disk surfaces, the method comprising generating a first pulse duty cycle signal for a first head and generating a second pulse duty cycle signal for a second head simultaneous with generating the first pulse duty cycle signal for the first head, wherein the first pulse duty cycle signal comprises a pulse width modulated signal comprising an on-time that is pulsed and the second pulse duty cycle signal is generated with a phase offset from the first pulse duty cycle signal.

10. The method as recited in claim 9, wherein the first pulse duty cycle signal controls a fly height of the first head.

11. The method as recited in claim 9, wherein the phase offset is selected so that only one of the first and second pulse duty cycle signals dissipates power at a time.

12. A method of operating a disk drive, the disk drive comprising a plurality of disk surfaces, and a plurality of heads actuated over the respective disk surfaces, the method comprising:

generating a first pulse width modulated signal for a first head; and generating a second pulse width modulated signal for a second head, wherein the second pulse width modulated signal comprises a phase offset from the first pulse width modulated signal.

13. The method as recited in claim 12, wherein the first pulse width modulated signal controls a fly height of the first head.

14. The method as recited in claim 12, wherein:
the first pulse width modulated signal comprises a first duty cycle adjusted in a first direction; and
the second pulse width modulated signal comprises a second duty cycle adjusted in a second direction opposite the first direction.

15. The method as recited in claim 12, wherein:
the first pulse width modulated signal comprises a first pulse duty cycle signal; and
the second pulse width modulated signal comprises a second pulse duty cycle signal.

16. The method as recited in claim 12, wherein the phase offset is selected so that only one of the first and second pulse width modulated signals dissipates power at a time.

\* \* \* \* \*